United States Patent [19]

Teich

[11] Patent Number: 4,588,861
[45] Date of Patent: May 13, 1986

[54] TELEPHONE INTERCOM SYSTEM

[76] Inventor: Rudor M. Teich, 137 Ralston Ave., South Orange, N.J. 07079

[21] Appl. No.: 634,287

[22] Filed: Jul. 25, 1984

[51] Int. Cl.$^4$ ............................................. H04M 1/72
[52] U.S. Cl. ............................... 179/81 R; 179/99 A; 179/99 H; 179/99 LS
[58] Field of Search ............... 179/81 R, 81 C, 99 R, 179/99 A, 99 H, 99 LS, 81 B, 84 T, 2 A, 37

[56] References Cited

U.S. PATENT DOCUMENTS

| | | | |
|---|---|---|---|
| 4,088,846 | 5/1978 | McEowen | 179/99 A |
| 4,100,375 | 7/1978 | Noller | 179/2 A |
| 4,196,317 | 4/1980 | Bartelink | 179/37 |
| 4,408,102 | 10/1983 | Lumpkin | 179/99 A X |
| 4,459,434 | 7/1984 | Benning et al. | 179/81 B |

*Primary Examiner*—James L. Dwyer
*Attorney, Agent, or Firm*—Gottlieb, Rackman & Reisman

[57] ABSTRACT

An intercom system which requires neither a common control nor specially-designed telephone instruments. A station module is connected to a two-line telephone outlet wherever an intercom station is desired, and a conventional telephone instrument is plugged into the module. The module includes a single push-button for setting up or joining an intercom call. Dialing is accomplished using the tone pad of the telephone instrument, with a DIP switch being provided in each station module for assigning an address to the module. When the handset of a telephone instrument is first placed off-hook, the instrument is automatically connected to the telephone line. To switch back from an intercom call (after the intercom button has been operated so that the instrument is connected to the intercom line), all that the user must do is momentarily depress the switch-hook of his telephone instrument. The system is designed to be fool-proof in the sense that the user really has to remember only two things: the intercom button is operated momentarily to originate or to join an intercom call, and the switch-hook is operated momentarily to transfer from an intercom call to the telephone line. Everything else is automatic, for example, each telephone instrument being connected automatically to the telephone line when the handset is placed on-hook.

15 Claims, 1 Drawing Figure

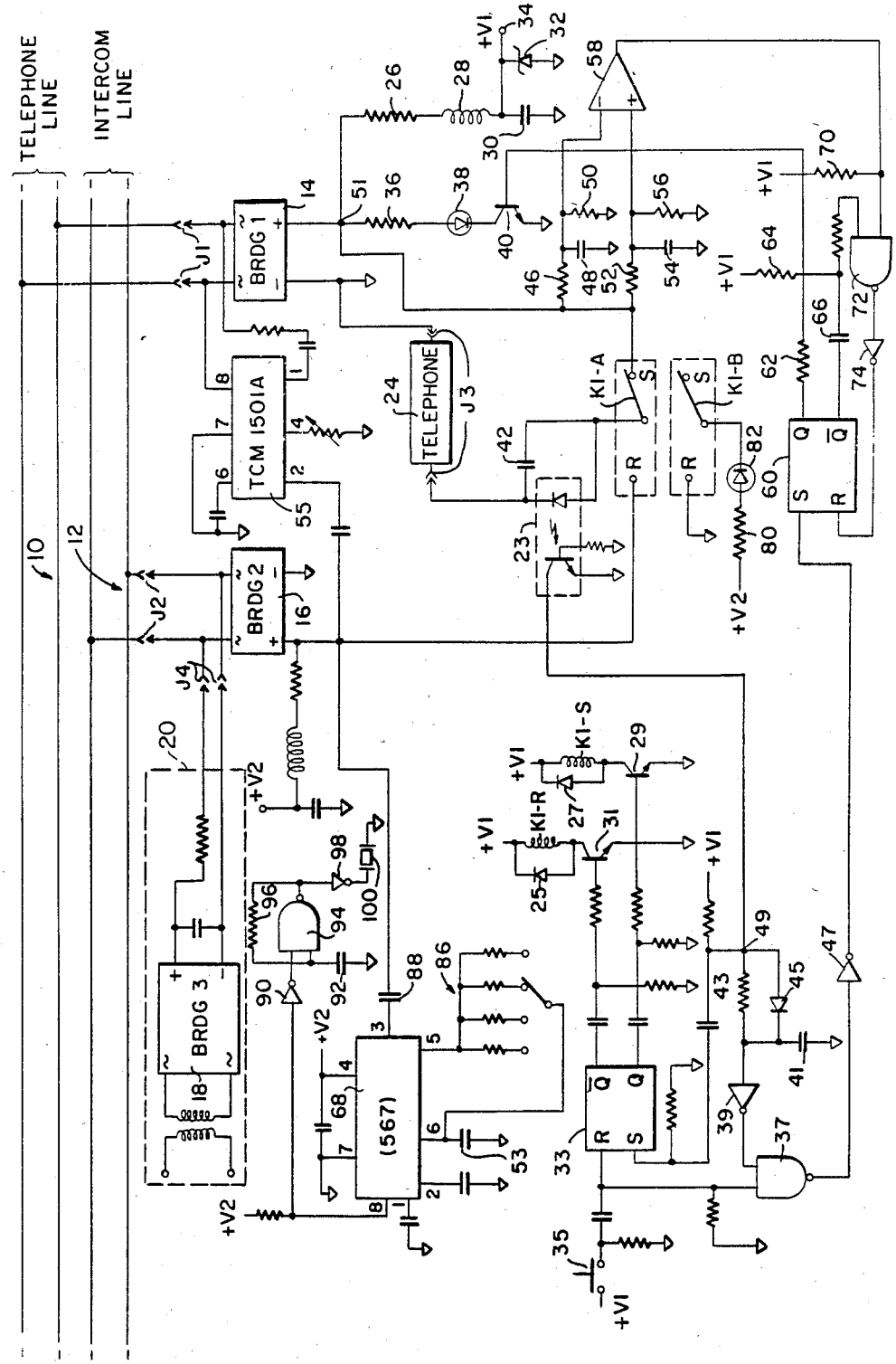

TELEPHONE INTERCOM SYSTEM

DESCRIPTION

This invention relates to intercom systems, and more particularly to an intercom system which is easy to use and can be installed in the home by a person having no technical knowledge.

There are many intercom systems for the home and the office. All are relatively complex and costly, or require specially trained personnel for installation. There exists a great need, and there is a big market for, an inexpensive intercom system which requires no training to install it. It is a general object of my invention to provide such an intercom system.

It is another object of my invention to provide an intercom system that is simple to install, simple to use, and which does not require any extra wiring.

The ordinary telephone includes a jack which plugs into a phone outlet. It is generally thought that there is a single pair of wires extended between all of the outlets in a home, with the pair of wires being connected to the telephone line. While there is such a pair of wires connected to the telephone line, in most homes there is usually a spare pair of wires connected to all of the phone outlets. The spare pair is provided in case a second telephone line will be added later on. Alternatively, the spare line is sometimes used to provide power for dial lights in certain phones. In the most convenient form of my invention, I use this second line as an intercom line.

The system of my invention can be thought as a "black box." Wherever an intercom station is to be provided, one of the intercom station boxes is provided. The intercom station box or module includes two jacks, one male and one female. The telephone instrument plugs into the female jack, instead of plugging into the phone outlet. The male jack plugs into the jack of the phone outlet. Installation is thus trivial, and there can be as many intercom phone extensions as there are phone outlets. Each intercom station includes a single "intercom" button which sets up an intercom call and also controls "holding" of the telephone line. Otherwise, all switching and signaling is controlled by the telephone instruments themselves, with tone signaling being used in the illustrative embodiment of the invention.

It is necessary to provide power for the intercom stations, that is, the modules of my invention. Some power is taken from the telephone line in the illustrative embodiment of the invention, and theoretically each intercom station could be completely powered by the telephone line. However, to avoid the use of excessive power from the telephone line in installations with a large number of extensions, power is also furnished to all of the intercom stations over the intercom line. The power is derived at any single selected intercom station, at which selected station an extra transformer and bridge circuit are provided. The transformer has to be plugged into a wall outlet, with the output of the bridge rectifier being plugged into the intercom module, and being extended through the module to the intercom line. (This means that at least one intercom station is provided with a third jack for connection to a power supply. Alternatively, a power supply module may be added, with the output plugged into a phone outlet jack connected to the intercom line.)

The system allows normal use of the phone instruments. In addition, each extension is able to ring or page the other extensions, conduct two-way conversations between extensions, place incoming calls on hold, and have incoming calls picked up from another extension. The single intercom button on the station module, together with the telephone instrument itself, controls all of these functions. The system does not interfere in any way with normal telephone functions such as call waiting (where the hook flash is used to transfer from one call to another), and normal operation in case of power failure.

The intercom module also includes two LED indicators, one for indicating that the telephone line is on "hold" and the other for indicating that an intercom connection has been established. Each station module is also provided with a DIP switch for selecting one of four resistors; the DIP switch allows each of up to four stations to be assigned a respective address for intercom signaling purposes.

As in many electronic systems, the human engineering aspects are as important as the electronic design. A system of this type must be easy and natural to operate. In order to appreciate the benefits of my invention, I will first describe the system operation in general terms, without reference to detailed circuitry.

Under normal conditions, each telephone instrument is connected to the telephone line extended to the central office, and thus acts as it would have without the intercom system. An incoming call results in ringing of the bell in the instrument, and any extension can be picked up to answer the call.

There can be up to four independently-addressed extensions, with each being signaled by the others by pressing respective digit buttons #2, #5, #8 and #0 on any telephone instrument. (The reason for the selection of these digits for the respective addresses will be explained below.) Suppose that a call comes in and is answered by an individual who picks up extension #2. Suppose, further, that the call is intended for an individual dual at extension #5. The person who answered the call at extension #2 momentarily presses the intercom button on his intercom module. This places the incoming call on the telephone line on hold, and transfers extension #2 to the intercom line. By then tone-dialing the extension number that is to be paged, #5 in this case, there will be ringing at intercom station #5. (There is a ringer provided for this purpose in each intercom module since the tone signaling comes in over the intercom line and each instrument is ordinarily connected to the telephone line.) The ringing will last as long as the party who is controlling the signaling keeps digit #5 pressed at his originating extension. (In the event more than four extensions are desired, the intercom modules can be designed to accommodate this extended capability, as will be apparent to those skilled in the art. It is also possible to provide ringing at all extensions if one of the digits is assigned for this purpose, e.g., if the originating extension presses digit #0, all of the other intercom modules might ring. It is also possible, at additional expense, to provide for a voice paging instead of tone-dialing. In such a case, the pressing of the intercom button would allow the originator to speak into the mouthpiece of his instrument, with speakers in all of the other intercom modules then reproducing his page. The design of such a system will also be apparent to those skilled in the art. In the preferred embodiment of my invention, these extra "bells and whistles" are not provided; the greatest market is for an intercom module which can be sold for less than $50.)

A party being signaled at station #5 now has two options. First, the telephone instrument can be picked up and be connected to the incoming call. (In many cases, this is precisely what will be done. The individual at station #5 probably heard the ringing when the incoming call was received, and when his intercom module rings, the ringing in the intercom module being different from the ordinary telephone ringing, it is an indication that the incoming call is for him; in such a case, the natural thing to do is simply to lift the handset on the telephone instrument.) Alternatively, the party being paged can elect to get on the intercom line in order to speak to the individual who is paging him. (In the absence of prior telephone line ringing, the party being paged will ordinarily realize that an intercom call is being made and that he is not being asked to get on the telephone line.) All that the party being paged has to do to effect this is to momentarily press the button on his intercom station, and to then pick up the handset of his telephone instrument.

Once the second instrument is connected to the intercom line, by the intercom button having been pressed before the handset was lifted, the two parties at extensions #2 and #5 can talk to each other over the intercom line while the incoming call is still on hold. When the switch-hook at either instrument is pressed down momentarily, the intercom mode is automatically terminated for that instrument and the telephone line is no longer held. For example, suppose that after the individual at instrument #2 informs the individual at instrument #5 over the intercom line that the incoming call is for him, the latter momentarily depresses the switch-hook on his telephone. As soon as he lets go of the switch-hook, his instrument will be connected to the telephone line. Moreover, the hold circuit in module #2 automatically resets as soon as any other instrument picks up the line. This means that as soon as instrument #5 is connected to the line, the hold circuit in the module at instrument #2 is turned off. With the turning off of the hold circuit at station #2, everything is returned to normal, except that station #2 is still connected to the intercom line. If the individual there wants to participate in the conversation on the telephone line, he momentarily depresses his switch-hook. Alternatively, he can just hang up (in which case his instrument is reconnected to the telephone line so that he can later use it).

In the event an intercom call is to be placed without an incoming call over the telephone having first occurred, the originating party simply pushes his intercom button momentarily and then lifts his handset. As long as the handset is lifted within five seconds of the intercom button having been operated, the telephone instrument will not be connected to the telephone line and the telephone line will "see" an on-hook condition. An intercom call can be placed in the usual way by pressing one of the digit buttons on the instrument. If a call comes in while two parties are engaged in a conversation over the intercom line, their instruments will not ring. Other instruments connected in the system will ring, but the instrument of any party engaged in an intercom call will not because his instrument is disconnected from the telephone line and thus current cannot be extended to the ringer in his instrument. For this reason, each station module is provided with a ring detector which is permanently connected to the telephone line. When a ring is detected, the circuit activates a tone oscillator. In that way, the parties engaged in an intercom conversation are notified of the incoming call.

There are numerous patents directed to the basic idea of allowing a telephone instrument to function both for its ordinary purpose, and as an intercom station. The closest prior art of which I am aware are the following four patents:

| Patent No. | Date | Inventor |
|---|---|---|
| 4,088,846 | May 9, 1978 | McEowen |
| 4,100,375 | July 11, 1978 | Noller |
| 4,196,317 | April 1, 1980 | Bartelink |
| 4,408,102 | October 4, 1983 | Lumpkin |

In all of the systems disclosed in these patents, a central or common control unit is required, or special modified telephone instruments must be used. Both of these shortcomings are eliminated in the system of my invention. The problem with a "master" or common control unit is that the phone line itself has to be modified by inserting a box in series with it. The ordinary consumer cannot do this. One of the great advantages of my invention is that an entire system can be installed simply by plugging an intercom module into a phone outlet wherever an intercom station is desired, and then plugging an ordinary telephone instrument into the module. My system is thus "masterless." As for those prior art systems which do not require a central control, they require modified telephone instruments. What this means is that the ordinary telephone instrument which a home owner now has can no longer be used, and instead a special instrument must be purchased wherever an intercom station is desired. The cost of such a special instrument, not to mention the cost of the ordinary instrument which can no longer be used, is much greater than the cost of the intercom module of my invention. In short, for a practical system, it is important that the phone line itself not have to be modified by inserting a control unit in series with it, and that ordinary telephone instruments be usable.

Other shortcomings of the prior art are that in many systems all instruments must be either in the "line" or "intercom" mode. This means that if an incoming call is placed on hold and an intercom call then takes place, all instruments must be returned to their on-hook positions before any extension can be re-connected to the outside line. If one extension is left in the intercom mode by mistake, no other extension will be able to pick up an incoming call.

Another advantage of the system of my invention is that one or more extensions can be connected on the telephone line in order to carry on a conversation with a calling or called party, while other extensions can carry on a conversation over the intercom line. Prior art systems which utilize the two lines which are to be found between phone outlets in the usual home do not have this capability; what happens is that one line is used for signaling, and the other for voice. This means that two voice conversations (telephone line and intercom) cannot take place simultaneously. In the system of my invention, because signaling takes place over the intercom line, even if one or more extensions are connected to the telephone line and engaged in conversation, another extension can originate an intercom conversation.

Further objects, features and advantages of my invention will become apparent upon consideration of the following detailed description in conjunction with the drawing which depicts an illustrative embodiment of my invention.

The telephone line is shown by the numeral 10 and the intercom line is shown by the numeral 12. Jacks J1 and J2 represent the interface of any station module to the two lines via a phone outlet. (The two jacks usually involve the same physical connection, one with four positions. In the general description above, the two jacks are considered as one since they appear as such to the user.) Jack J3 is the mechanism by which an ordinary telephone instrument 24 is connected to the station module. It will be noted that there is an additional jack J4 in the station module for connection to power supply 20. The power supply consists of a conventional step-down 12-volt transformer for connection to a wall outlet, bridge rectifier 18, and a standard filter capacitor and current limiting resistor for deriving a source of DC voltage. Only a single power supply is required and it need be connected to jack J4 of only one station module (even though each station module may include a jack J4). As described above, the power supply can be connected directly to the intercom line at any unused phone outlet.

Two rectifier bridges 14 and 16 are provided in order to make operation of the station module independent of the polarity of the tip and ring connections. In many home installations, the tip and ring are reversed in some or all of the outlets, often because of miswiring by the home owner himself. Were the circuitry to be connected to the wires directly without the bridges, the intercom module would not function correctly in these installations. Each of the two bridges has its negative terminal connected to the internal ground of the module. The internal ground is a floating common potential of the circuit, and is not earth ground. Similarly, one of the telephone instrument leads is connected to this ground. Telephone instrument 24 is connected to the telephone line through bridge 14 and the path which includes contact K1-A and the diode which is part of opto-isolator 23. Current which flows when the telephone instrument is off-hook flows through the diode and causes the transistor in the opto-isolator to conduct. It is the conduction of the transistor which allows the module to determine the status of the telephone handset. Capacitor 42 is provided in parallel with the diode of the opto-isolator in order to allow audio signals to be conducted without attenuation, that is, to by-pass the diode.

Contact K1-A has two positions as shown, R and S. The normal position is as shown, with the telephone instrument being connected across the telephone line. When relay K1 operates, and contact K1-A switches from the S position to the R position, it will be seen that telephone instrument 24 is connected through the diode of the optoisolator, the contact, and bridge 16 to the intercom line 12, rather than through bridge 14 to the telephone line 10. The opto-isolator is used in this case also to detect an off-hook condition. A second contact K1-B is operated by the same relay K1. When the instrument is connected to the telephone line, current does not flow from source V2 through resistor 80 and light-emitting diode 82. However, when contact K1-B switches to its R position, current does flow. Thus, LED 82 is illuminated to indicate a connection of the telephone instrument to the intercom line; the user merely has to look at this LED to determine to which line his instrument is connected.

It should be noted that opto-isolator 23 determines the on/off hook status of the telephone instrument no matter what the position of contact K1-A. A DC potential is applied to the telephone line by the telephone central office, and the intercom line has a DC potential applied to it by the single power supply 20 which is employed in the system. A positive potential appears at each of positions R and S associated with contact K1-A in each station module. Consequently, no matter what the position of the contact, when the handset of telephone instrument 24 is lifted, current flows through the opto-isolator 23 to indicate an off-hook status.

The relay itself is a dual-coil, magnetically-latched device. When flip-flop 33 is first reset, transistor 31 conducts momentarily and current flows through coil K1-R. This causes contacts K1-A and K1-B to switch to their R positions so that the instrument is connected to the intercom line and LED 82 turns on. Diode 25 is provided to prevent large transient voltages from developing across coil K1-R when transistor 31 ceases to conduct. The capacitor and resistors connected between the $\overline{Q}$ output of flip-flop 33 and the base of transistor 31 serve to determine the width of the pulse which activates relay coil K1-R. Similar remarks apply to coil K1-S, diode 27 and transistor 29. Contacts K1-A and K1-B switch to their S positions when the flip-flop is first set. A latched relay is used in order to reduce the power consumption of the module and to increase its reliability.

It is when intercom button 35 is first depressed that positive potential V1 is extended to the R input of the flip-flop. Thus, it is the operation of the intercom button that causes contacts K1-A and K1-B to switch to their R positions, and for the telephone instrument to be connected to the intercom line. As mentioned before, what causes the telephone instrument to be re-connected to the telephone line is when an on-hook condition is detected (even a momentary depression of the switch-hook). At that time, any current which previously flowed through contact K1-A and the diode of the opto-isolator ceases to flow. Even if the cessation is only momentary, the low potential which previously existed at node 49 rises as soon as the instrument is placed on-hook. The positive step transmitted to the S input of the flip-flop causes coil K1-S to be pulsed and the telephone instrument to be re-connected to the telephone line.

A DC potential V1 is derived at terminal 34 for powering some of the electronic circuits in the module. The positive output of bridge 14 is extended through resistor 26 and an impedence choke 28 to a smoothing capacitor 30. The capacitor presents a short for audio signals on the line, and it is for this reason that it must be AC-isolated from the line through the choke. A 12-volt Zener diode 32 limits the voltage that is applied at terminal 34. As long as most of the circuitry in the module is of the CMOS type, negligible power is consumed and source V1 can be used to power the module from the telephone central office. However, there are some devices in each module which are relatively power hungry, for example, the tone decoder integrated circuit 68, to be described below. For this reason, a similar but separate power supply is connected to the positive output of bridge 16, this supply serving to derive potential V2. This potential is thus derived from the intercom line, which, in turn, is derived from power source 20. Although source V2 could be used to power the rest of the circuitry as well, it is preferable that the power supply for the relay and its various drivers come from the telephone line; in the event of a power failure, the current in the telephone line will still allow fail-safe operation of the station module. The two power supplies are comparable, except that the V2 source does not require a Zener diode inasmuch as there is no danger of a voltage surge in the V2 source because of the absence of an AC ringing signal on the intercom line.

Transistor 40 serves to "hold" the telephone line when the telephone instrument 24 is switched to the intercom line after an incoming call has been answered. As will be described below, to place the telephone line on hold, flip-flop 60 is set. The Q output goes high and a positive potential is extended through resistor 62 to the base of transistor 40. At this time, the path from the circuit ground, through bridge 14, the telephone line, back through the bridge, resistor 36, LED 38 and the transistor is completed, and current flows. This current keeps the line on hold. It also causes LED 38 to turn on. This LED indicates to the user that the telephone line is on hold. The hold circuit is broken when the flip-flop is reset when any previously off-hook telephone instrument goes on-hook, even momentarily upon depression of its switch-hook.

As mentioned earlier, it is the momentary depression of intercom button 35 which places the telephone line on hold and transfers an off-hook telephone instrument to the intercom line. When intercom button 35 is momentarily depressed, it was already described how the positive potential from source V1 resets flip-flop 33 so that the telephone instrument is switched to the intercom line. The same positive potential is applied to one input of NAND gate 37. With the telephone instrument previously off-hook, node 49 is at a low potential due to conduction of the transistor in the opto-isolator. (The telephone instrument was previously off-hook when, for example, an incoming call was answered.) The output of inverter 39 is thus high to enable the second input of NAND gate 37. Thus with the depression of intercom button 35, the output of gate 37 goes low, and the output of gate 47 goes high to set flip-flop 60, thus placing the telephone line on hold.

It was also described, however, that the intercom button must be momentarily operated in order to set up an intercom call even if there was no telephone call in progress. In such a case, flip-flop 33 is still reset so that telephone instrument 24 (which is still on-hook) is connected to the intercom line. However, gate 37 is not operated this time because node 49 is at the positive potential of source V1 since the transistor in optoisolator 23 does not conduct. The output of inverter 39 is thus low and the output of gate 37 remains high. It is important in this case that flip-flop 60 not be set. Since there is no telephone call in progress, the telephone line should not be placed on hold because that would be an indication to the telephone central office that the line is "busy" when it is not.

Thus, in order to place an intercom call when a connection has already been established to the telephone line, all that is required is to momentarily operate intercom button 35. The telephone instrument is automatically transferred to the intercom line and the telephone line is placed on hold. On the other hand, in order to establish an intercom call without a connection having been previously established, what should be done is to depress the intercom button 35 while the handset remains on-hook. This causes relay K1 to transfer its contacts to their R positions. When the user then lifts his handset, his instrument will already be connected to the intercom line and he can dial the desired extension.

The placing of an intercom call after an incoming call has already been answered (or even after an outgoing call has been placed), i.e., as long as the telephone instrument is off-hook and a connection is established to the telephone line, is not prone to mis-operation. All the user must do is to momentarily operate his intercom button, and there is not much else that he can do. The same is not true when placing an intercom call if there is no prior connection to the telephone line. The user is supposed to operate the intercom button and then go offhook. It is certainly possible, however, that he will go off-hook and then operate his intercom button. Ordinarily, this would cause the telephone line to go on hold, as described above, and that is not what the user wants.

To prevent this from happening, capacitor 41, resistor 43 and diode 45 are provided. They provide a 5-second delay between the handset being lifted and gate 37 being allowed to energize its output upon the operation of intercom button 35. When the handset is first lifted, node 49 drops in potential since current flows through the transistor of opto-isolator 23. However, the voltage across capacitor 41 cannot change instantaneously, so the input of inverter 39 remains high, the output remains low, and gate 37 is not enabled. As long as the intercom button 35 is operated within five seconds of the handset having been placed off-hook, the momentary positive potential applied to the connected input of gate 37 has no effect; the gate remains disabled and flip-flop 60 is not set in order to place the telephone line on hold. It is assumed that if the intercom button is operated within five seconds of the subscriber having gone off-hook, what he intended to do was to place an intercom call because the only time the intercom button is to be operated is when an intercom connection is being effected. It is only after five seconds have elapsed following the handset having been switched off-hook that the momentary operation of intercom button 35 will cause flip-flop 60 to set and the telephone line to be placed on hold. If more than five seconds have gone by since the telephone handset was lifted without the intercom button having been operated, it is an indication that an incoming call was answered or an outgoing call was placed; thus, operation of the intercom button should result in the telephone line being placed on hold. Diode 45 is provided so that as soon as the handset is placed on-hook, or as soon as the switchhook is depressed momentarily, capacitor 41 can charge rapidly from source V1, rather than current having to flow through resistor 43. The system is restored immediately to its normal condition (with the instrument connected to the telephone line rather than the intercom line).

In order to make the system easy to operate, the user really has to remember two things. First, operation of the intercom button will allow an intercom call to be established. (As described immediately above, it is not even important that the user remember that the intercom button should be operated before he goes off-hook.) The second thing that must be remembered is how to get back to the telephone line, for example, to resume a conversation which is on hold after carrying on a conversation over the intercom line. There is only one other normally-used (non-signaling) button available and that is the switchhook. All the user has to do is momentarily depress the switch-hook on the instrument and he will be re-connected to the telephone line.

But before describing how this is accomplished, what must be considered is which individual will be switching from the intercom line to a held telephone line. Party A may have answered an incoming call, placed the call on hold, and then placed an intercom call to party B. After they have conversed, either one of the two parties may want to be connected to the telephone line, or perhaps both of them will want to join the conversation. Another situation which must be taken into account is where an intercom call is set up, but the called party recognizes from the signaling alone that the telephone call is for him. (For example, with two individuals in a house and party A expecting a telephone call, if the phone rings and then stops, party A can deduce that party B answered the call; if the module at party A's location then rings, it is an indication that the call is for him.)

The hold circuit in any module is released when any instrument is connected to the held telephone line. The rationale is that once another instrument is connected to the telephone line, the hold should be released by the holding instrument as the other phone has taken over the telephone line call. The mechanism for releasing the hold in any station module is controlled by node 51 going low in potential. Before describing how the hold is released, it should be noted what will make node 51 go low in the first place. The node is connected to the positive output of bridge 14, and thus it is connected to telephone line 10. Suppose that the line is on hold and the module shown in the drawing has been used to signal another party. If the signaled party lifts up his handset without even pressing his intercom button, he will be connected to the telephone line. The current which now flows in the line results in node 51 in every station module going low in potential. This is an indication to the module which first placed the telephone line on hold that the hold can be released. Suppose, however, that the signaled party pressed his intercom button so that he was engaged in an intercom call while the telephone line was on hold. All that a user must remember is that in order to get back onto the telephone line, he must momentarily depress his switch-hook. Doing so causes current flow through the opto-isolator to cease and flip-flop 33 to set. This immediately transfers contact K1-A to the S position where the instrument is connected to the telephone line. Thus the momentary depression of the switch-hook by the signaled party results in his being transferred from the intercom line to the telephone line. As soon as this happens, not only can he engage in conversation on the telephone line, but node 51 in his own and every station module drops in potential. When node 51 in the station module which was maintaining the hold drops in potential, the hold is released.

Suppose further that the party who answered the call desires to re-engage the conversation—either alone, or with the party whom he signaled. If the signaled party operates his switch-hook first, the hold will be released in the module of the party who placed the intercom call. However, he will still not be connected to the telephone line since his flip-flop 33 is still reset. If he operates his switch-hook momentarily, however, his flip-flop 33 will reset and he will be connected to the telephone line along with the other party. If he alone operates his switch-hook, not only will his flip-flop 33 be reset so that he is connected to the telephone line, but as soon as he is connected to the telephone line his node 51 drops in potential and the hold controlled by his module is released. Lastly, if he does not wish to re-engage in the conversation, leaving it up to the signaled party, he simply hangs up. His flip-flop 33 is reset so that his instrument is connected to the telephone line even though he is on-hook, ready to answer or place another telephone call later on. The telephone line remains on hold, however, until the other party connects to the line and all nodes 51 go low in potential.

Thus all any user really has to remember is that if he is already on-hook and engaged in an intercom call, to be re-connected to the telephone line the switch-hook has to be operated momentarily. Alternatively, in order to pick up the telephone line without first engaging in an intercom call, all that has to be done is to lift the telephone handset. In all cases, node 51 in each module goes low in potential. Operational amplifier 58 is connected in a differential mode to the telephone line through bridge 14 in each module. Its inverting and noninverting inputs track the line voltage, but with two different delays. The delay introduced by resistors 46, 50 and capacitor 48 is shorter than that introduced by resistors 52, 56 and capacitor 54. This means that the inverting input follows the line voltage readily, while the non-inverting input reflects the voltage that was on the line about 100 milliseconds before. Any abrupt change in the line voltage reaches the inverting input immediately and causes the output of the amplifier to rise for about 100 milliseconds, until the slower non-inverting input catches up. The positive pulse at the output of amplifier 58 is applied to one input of NAND gate 72, the other input of which is normally held at the high potential of source V1. The output of the gate goes low and the output of inverter 74 goes high to reset flip-flop 60, thus removing the hold.

The output of amplifier 58 is not connected directly to the reset input of flip-flop 60. When the hold is first engaged, flip-flop 60 is set. This means that a low potential is applied through capacitor 66 to disable gate 72. It is only after capacitor 66 charges through resistor 64 from source V1 that gate 72 is enabled. The net effect is that for a preset time (one second) after the hold circuit was first engaged, it cannot be released upon the momentary depression of a switch-hook. The reason for this is that ringing on the telephone line caused by application of the hold resistor 36 might in and of itself be reflected by node 51 going low in potential. Similarly, the switching of contact K1-A might cause the node to go low in potential momentarily. By disabling the detection circuitry associated with amplifier 58 until all transients have died down, false operation is prevented.

After any user engages the intercom line, he may signal another party by pressing the appropriate digit button on his telephone instrument. Each module includes a tone decoder 68 of the Signetics 567 type. When the decoder detects the tone associated with the respective module, it activates an oscillator which drives a piezoelectric buzzer.

After the incoming button 35 has been momentarily operated and relay K1 has switched its contacts to the R positions, telephone instrument 24 is connected to the intercom line. The intercom line in every module is connected via bridge 16 through capacitor 88 to tone decoder 68. The operation of any digit button on a telephone instrument thus causes the associated pair of tones to be transmitted over the intercom line to the tone decoder in all modules. The operation of any digit button causes two frequencies to be generated. Since it will be rare that more than four extensions are required in any system, in the illustrative embodiment of the invention each module can have only one of four possible addresses. This allows only a single tone to represent each module, thus simplifying the decoding. Each column on the telephone keypad uses a common frequency, with a different frequency to differentiate the individual digits. Thus, the middle column (#2, #5, #8, #0) has one frequency in common, and one unique frequency for each digit. It is the four unique frequencies which are used to differentiate between modules having assigned addresses #2, #5, #8 and #0.

tone decoder integrated circuit 68 is shown with its standard pin connections. At the heart of the decoder is a phase-locked loop that is preset to decode only one tone frequency. The tone which can be decoded by each integrated circuit 68 is determined by capacitor 53 (the same in each module) and the particular one of the four resistors in DIP switch 86 which is selected. A different resistor is selected for each module, so that each module can be assigned one of the four possible digit codes. The user himself sets the address of each station.

The incoming tone is extended through capacitor 88 which is provided for DC isolation purposes. When a tone has been decoded, pin 8 of the decoder goes low in potential and the output of inverter 90 goes high. This enables the oscillator which comprises NAND gate 94, resistor 96 and capacitor 92. The audio frequency generated by the oscillator is extended through inverter 98 to buzzer 100. Thus as long as the initiating party depresses a digit on his instrument, the buzzer in the signaled station will sound.

It should be appreciated that when a user is engaged in an intercom call, his telephone instrument is not connected to the telephone line so that he cannot hear an incoming ringing signal (although other telephone instruments in the house will ring). In order that any party engaged in an intercom call be informed that there is an incoming call on the telephone line, a ring detector 55 is provided. The TCM 1501A integrated circuit (made by Texas Instruments) is shown only with some of its pin and component connections. The input pins 1 and 8 are connected to the telephone line. When a ringing signal is detected, a 2 KHz tone is applied to the output of bridge 16. In this way, any party engaged in an intercom call is informed that there is an incoming call on the telephone line.

Although the invention has been described with reference to a particular embodiment, it is to be understood that this embodiment is merely illustrative of the application of the principles of the invention. For example, instead of a push-button 35 which is operated only momentarily to establish an intercom connection and use of the telephone instrument switch-hook to get back to the telephone line, a two-position switch on the intercom module could be used. Thus numerous modifications may be made in the illustrative embodiment of the invention and other arrangements may be devised without departing from the spirit and scope of the invention.

I claim:

1. An intercom station module for interconnecting a conventional telephone instrument to a telephone line and an intercom line comprising a control button, means responsive to momentary operation of said control button for establishing a connection from said telephone instrument to said intercom line, means responsive to the momentary cessation of current flow through said telephone instrument for establishing a connection from said telephone instrument to said telephone line, means responsive to momentary operation of said control button when said telephone instrument is off-hook and a connection is established to said telephone line for placing said telephone line on hold, and means responsive to an abrupt change in the DC voltage across said telephone line for removing the hold from said telephone line.

2. An intercom station module in accordance with claim 1 further including timing means, means for triggering said timing means to time a predetermined interval responsive to said telephone instrument first being placed off-hook, and means for disabling operation of said hold placing means when said control button is momentarily operated if said timing means has not yet timed said predetermined interval after said telephone instrument was first placed off-hook.

3. An intercom station model in accordance with claim 1 further including means for disabling operation of said hold removing means for a pre-set time interval following the initial placing of said telephone line on hold.

4. An intercom station model in accordance with claim 1 further including means for assigning a single identifying tone to the station module, and means responsive to the appearance of said tone, as one of a pair, on said intercom line for indicating the signalling of the module by another module.

5. An intercom station model in accordance with claim 1 further including means for indicating when a connection is established from said telephone instrument to said intercom line, and means for indicating when said telephone line is on hold.

6. An intercom station model in accordance with claim 1 further including means for powering at least part of the module from a DC potential which appears on said intercom line.

7. An intercom station model in accordance with claim 1 further including means for detecting a ringing signal on said telephone line and in response thereto for applying a ringing signal which is extended to the telephone instrument.

8. A "masterless" intercom system comprising a plurality of station modules each for interconnecting a respective conventional telephone instrument to a telephone line and an intercom line, each station module having control means, means responsive to operation of said control means for breaking the connection from said telephone instrument to said telephone line and instead estabishing a connection to said intercom line, means for establishing a connection from said telephone instrument back to said telephone line, means responsive to operation of said control means when said telephone instrument is off-hook and a connection is established to said telephone line for placing said telephone line on hold, and means responsive to an abrupt change in the DC voltage across said telephone line for removing the hold from said telephone line.

9. A system in accordance with claim 8 wherein each module further includes timing means, means for triggering said timing means to time a predetermined interval responsive to said telephone instrument first being placed offhook, and means for disabling operation of said hold placing means when said control means is operated if said timing means has not yet timed said predetermined interval after said telephone instrument was first placed off-hook.

10. A system in accordance with claim 8 wherein each module further includes means for disabling operation of said hold removing means for a pre-set time interval following the initial placing of said telephone line on hold.

11. A system in accordance with claim 8 wherein said means in each module for establishing a connection back to said telephone line includes means operative in response to the even momentary cessation of current flow through the respective telephone instrument.

12. A system in accordance with claim 8 wherein each module further includes means for assigning a single identifying tone to the module, and means responsive to the appearance of said tone, as one of a pair, on said intercom line for indicating the signalling of the module by another module.

13. A system in accordance with claim 8 wherein each module further includes means for indicating when a connection is established from the respective telephone instrument to said intercom line, and means for indicating when said telephone line is on hold.

14. A system in accordance with claim 8 wherein each module further includes means for powering at least part of the module from a DC potential which appears on said intercom line.

15. A system in accordance with claim 8 wherein each module further includes means for detecting a ringing signal on said telephone line and in response thereto for applying a ringing signal which is extended to the respective telephone instrument.

* * * * *